United States Patent [19]

Finke et al.

[11] Patent Number: 4,864,009
[45] Date of Patent: Sep. 5, 1989

[54] MOLDING COMPOSITION CONSISTING OF ALIPHATIC/AROMATIC COPOLYAMIDE

[75] Inventors: Juergen Finke; Wolfgang Neugebauer, both of Marl; Holger Koziel; Martin Bartmann, both of Recklinghausen, all of Fed. Rep. of Germany

[73] Assignee: Huels Aktiengesellschaft, Marl, Fed. Rep. of Germany

[21] Appl. No.: 250,562

[22] Filed: Sep. 29, 1988

[30] Foreign Application Priority Data

Jan. 8, 1988 [DE] Fed. Rep. of Germany ....... 3800293

[51] Int. Cl.$^4$ ............................................. C08G 73/10
[52] U.S. Cl. ................................... 528/172; 528/125; 528/128; 528/171; 528/173; 528/183; 528/184; 528/185
[58] Field of Search ............... 528/125, 128, 171, 172, 528/173, 184, 185

[56] References Cited

U.S. PATENT DOCUMENTS 3,514,415  5/1970  Karol et al. ......................... 528/172
4,786,706 11/1988  Kock et al. ......................... 528/125

*Primary Examiner*—Harold D. Anderson
*Assistant Examiner*—T. Mason
*Attorney, Agent, or Firm*—Oblon, Spivak, McClelland, Maier & Neustadt

[57] ABSTRACT

A molding composition, comprising an aliphatic-/aromatic copolyamide polymer having statistically distributed throughout the polymer:

(A) from greater than 40 to less than 100 mole % aliphatic monomer units containing amino groups, carboxyl groups or mixtures thereof; and (B) up to 60 mole % of aromatic monomer units containing amino groups, carboxy groups or mixtures thereof, said aromatic monomer units containing at least one member selected from the group consisting of 4,4'-bis(4-aminophenoxy)diphenyl sulfone, 4,4'-bis(3-aminophenoxy)diphenyl sulfone, 4,4'-bis(4-aminophenoxy)benzophenone, and 4,4'-bis(3-aminophenoxy)benzophenone.

20 Claims, No Drawings

MOLDING COMPOSITION CONSISTING OF ALIPHATIC/AROMATIC COPOLYAMIDE

BACKGROUND OF THE INVENTION

1. Field of the Invention

The present invention is related to molding compositions comprising aliphatic/aromatic copolyamides.

2. Discussion of the Background

Aromatic polyamides that contain 4,4'-bis(4-aminophenoxy)diphenyl sulfone are disclosed by DE-OS No. 36 09 011. Similar aromatic polyamides which can contain fractions up to 40% of an aliphatic polyamide are likewise described in DE-OS No. 35 39 846.

SUMMARY OF THE INVENTION

One object of the present invention is to provide thermoplastically processable polyamides with high mechanical strength, high dimensional stability when heated, and good chemical resistance.

This and other objects which will become apparent from the following specification have been achieved by the present molding compositions consisting of copolyamides that have statistically distributed throughout the polymer:

A. from greater than 40 to less than 100 mole % aliphatic monomer units containing amino groups and/or carboxyl groups, and B. up to 60 mole % aromatic monomer units containing amino and/or carboxyl groups, where the aromatic diamine is 4,4'-bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)-benzophenone, or mixtures of these.

DETAILED DESCRIPTION OF THE PREFERRED EMBODIMENTS

The polyamides of the invention are made by polycondensation of alpha, omega-dicarboxylic acids with alpha, omega-diamines and/or polycondensation of alpha, omega-aminocarboxylic acids or their lactams by known methods.

Molding compositions whose copolyamides contain greater than 60 mole %, especially 80 to 95 mole % aliphatic fractions, with the remainder consisting of aromatic fractions to make up 100 mole %, are preferred.

Aliphatic dicarboxylic acids that may be used according to the invention are those with 4 to 20 carbon atoms in the carbon chain, such as succinic acid, glutaric acid, adipic acid, suberic acid, pimelic acid, or sebacic acid. The corresponding anhydrides, acid halides or other functional derivatives can also be used.

Preferred aromatic dicarboxylic acids include:

I. Isophthalic acid, terephthalic acid, where both acids may be monosubstituted or polysubstituted by the following groups on the aromatic ring:
(a) $C_{1-6}$alkyl,
(b) phenyl and $C_{1-6}$alkyl- or aryl-substituted phenyl groups,
(c) alkoxy groups with 1–6 carbon atoms,
(d) phenoxy groups, in which the phenyl ring is unsubstituted or may be substituted by $C_{1-6}$ alkyl groups or aryl groups
(e) halogen, especially chlorine and bromine;

II. Dicarboxylic acids of the general formula

HOOC—Ar—O—Ar—$SO_2$—Ar—O—Ar—COOH where Ar is m-phenylene or p-phenylene; such as 4,4'-bis(4-carboxyphenoxy)diphenyl sulfone or 4,4'-bis(3-carboxyphenoxy)diphenyl sulfone, for example;

III. Dicarboxylic acids of the general formula

HOOC—Ar—A—Ar—COOH where Ar is m-phenylene or p-phenylene; and A is —O—, —S—, —$SO_2$—, or —CO—. Suitable acids include 4,4'-dicarboxydiphenyl ether, 4,4'-dicarboxydiphenyl sulfone, 4,4'-benzophenonedicarboxylic acid, 4,4'-biphenyldicarboxylic acid, for example.

Aliphatic diamines that can be used are those with 4 to 20 carbon atoms in the carbon chain, such as tetramethylenediamine, hexamethylenediamine, trimethylhexamethylenediamine, octamethylenediamine, isophoronediamine, decamethylenediamine, dodecamethylenediamine, 4,4'-diaminodicyclohexylmethane, or 4,4'-diamino-3,3'-dimethyldicyclohexylmethane, for example.

Aromatic diamines that may be used are the following compounds: 4,4'-bis(4-aminophenoxy)diphenyl sulfone, 4,4'-bis(3-aminophenoxy)diphenyl sulfone, 4,4'-bis(4-aminophenoxy)benzophenone, 4,4'-bis(3-aminophenoxy)benzophenone, or their mixtures.

Up to 20 mole % of these aromatic diamines can be replaced by diamines of the following general formula:

$H_2N$—Ar—(($Z)_q$—Ar$)_r$—$NH_2$ where Ar is a m- or p-phenylene group, Z is identical or different groups selected from the list —O—, —S—, —$SO_2$—, —CO—, and —$C(CH_3)_2$—, q=0 or 1, and r=0, 1, or 2.

Particularly useful examples of such diamines are m- or p-phenylenediamine; 4,4'-diaminodiphenyl ether; 4,4'-diaminodiphenyl sulfone, and 4,4'-diaminobenzophenone.

The aliphatic dicarboxylic acids and diamines noted above can also be replaced partly or completely by aliphatic alpha, omega-aminocarboxylic acids or their lactams with 4 to 20 carbon atoms. Examples include aminoundecanoic acid, aminododecanoic acid, caprolactam, or laurolactam (12 carbon lactam), preferably caprolactam and laurolactam. 0.95 to 1.05 mole, preferably 1 mole, of carboxyl groups is used for 1 mole of amino groups.

The preparation of the present copolyamides can be carried out in a simple manner by known methods (for example, DE-OS No. 35 39 846 and OS No. 36 09 011). In the preparation, the starting materials are melted in the absence of oxygen, preferably in an inert gas atmosphere, at temperatures in the range of 180° to 350° C., preferably from 200° to 300° C. The polycondensation takes place with the elimination of water. It does not matter whether the reaction occurs at normal pressure, increased pressure, or under vacuum. The polycondensation can be carried out in solution or in the melt.

It is possible to use catalysts, but this is not necessary. Suitable catalysts are described, for example, in DE-OS No. 35 39 846 and OS No. 36 09 011.

If the copolyamide end product does not have a sufficiently high molecular weight, a post-condensation can follow in the melt or in the solid phase.

A wide choice of starting materials may be used at the beginning of the polycondensation. Thus, it is possible to use all aromatic and aliphatic components as mixed monomers. In the same way, it is possible first to polycondense an oligomeric/polymeric aromatic amide and the corresponding aliphatic amide in separate steps, and only then to make the final polyamide from the mixture of the two initial oligomers/polymers.

The polyamides pursuant to the invention have a viscosity in the range of $\eta_{rel}=1.10$ to 2.30, preferably from 1.50 to 2.25.

The glass temperatures ($T_g$) of the polyamides of the present invention are in the range from 100° to 220° C., preferably from 150° to 200° C.

If desired, auxiliaries and additives such as stabilizers, fillers such as talc, or reinforcing agents such as glass fibers, ARAMID ® fibers, or carbon fibers, and other conventional additives such as pigments, processing aids, mold release agents, or stabilizers can also be added.

The molding compositions thus obtained are processed into shaped parts using known procedures such as extrusion or injection molding, for example.

The polyamides of the present invention have higher glass temperatures than the generally known comparable aliphatic polyamides, and thus they show higher dimensional stability when heated, even when heated without reinforcing agents. Unexpectedly, they have high mechanical strength at a level comparable to that of fully aromatic polyamides, and at the same time they have substantially better impact strength than the aromatic polyamides alone. It is also surprising that even small fractions of aromatic amide distinctly improve the chemical resistance.

Other features of the invention will become apparent according to the following descriptions of the exemplary embodiments which are given for illustration of the invention and are not intended to be limiting thereof.

EXAMPLES

The parameters mentioned in the specification and in the examples were determined using the following procedures.

The DSC studies to determine the glass temperature ($T_g$) and the melting point ($T_m$) were carried on a DSC1B Perkin-Elmer Calorimeter with a heating rate of 16° K./min. The relative viscosity was measured with a Ubbelohde viscosimeter at 25° C. in m-cresol (concentration: 0.5 wt. % polyamide). The J-values were determined on 0.5 wt. % solutions of the polymers in a phenol/o-dichlorobenzene mixture (50:50 parts by weight) at 25° C. by the method of DIN 53 728.

EXAMPLE 1

Starting materials:

13.864 g (0.08345 mole) terephthalic acid (TA)
2.774 g (0.01670 mole) isophthalic acid (IA)
14.361 g (0.08334 mole) 1,10-diaminodecane
7.210 g (0.01667 mole) 4,4'-bis(4-aminophenoxy)-diphenyl sulfone (BAPS)
43 µl 50% aqueous $H_3PO_2$
49 mg Dimethylaminopyridine (DMAP)

The starting materials are mixed in a polycondensation tube with stirrer, nitrogen inlet, and distillation condensor and were stirred under nitrogen at normal pressure for 15 min at 250° C., 15 min at 280° C., and 20 min at 300° C., after which the polycondensation was carried out for an additional 15 min at 300° C. while applying a vacuum of 2.5 mbar. The polyamide had a $T_g$ of 138° C., a $T_m$ of 281° C., and an $\eta_{rel}$ of 1.92.

EXAMPLE 2

Starting materials 16.613 g (0.10 mole)
13.455 7 g (0.085 mole)trimethylhexamethylenediamine
6.487 g (0.015 mole) BAPS
43 µl 50% aqueous $H_3PO_2$
49 mg DMAP The reaction was carried out in the same way as Example 1. The polymer had a $T_g$ of 165° C. and $\eta_{rel}$ of 1.78.

EXAMPLE 3

Starting materials
23.05 g (0.100 mole) dodecanedicarboxylic acid
43.25 g (0.100 mole) BAPS
43 µl 50% aqueous $H_2PO_4$
49 mg DMAP The reaction was carried out in the same way as Example 1, but with the difference that the reaction time at 300° C. under vacuum was doubled. The polymer had a $T_g$ of 180° C. and an $\eta_{rel}$ of 1.74.

EXAMPLE 4

Starting materials 21.62 g (0.05 mole) BAPS
19.94 g (0.12 mole) IA
15.00 g (0.074 mole) aminoundecanioc acid
11.01 g (0.07 mole)trimethylhexamethylenediamine
82.00 mg phosphorous acid
122.00 mg DMAP The starting materials were mixed in a polycondensation tube with stirrer, nitrogen inlet, and distillation condensor and were stirred under nitrogen at normal pressure for 5 h at 280° C. The polymer had an $\eta_{rel}=1.37$.

EXAMPLE 5

28.61 parts by weight (0.14 mole) of laurolactam and 22.43 parts by weight (0.14 mole) of isophthalic acid were weighed into a glass reactor and atmospheric oxygen was removed by multiple flushing with nitrogen. The reactor was placed in a metal bath at a temperature of 250° C. The lactam was ring-opened with stirring under a stream of nitrogen in 2 hours. After cooling to about 230° C., 15.14 parts by weight (0.04 mole) of bis(4-aminophenoxy)diphenyl sulfone and 14.30 parts by weight (0.10 mole) of m-xylylenediamine were introduced into the reactor. A catalyst consisting of hypophosphorous acid and dimethylaminopyridine was also added in an amount of 0.5 wt. % based on the total starting monomers. The mixture was polycondensed while distilling off the water of reaction and steadily increasing the temperature. After 4 hours and at a final temperature of 280° C. a transparent copolyamide was formed with an $\eta_{rel}$ value of 1.71 and a $T_g$ of 125° C.

EXAMPLE 6

Conforming to the conditions of Example 5, 28.61 parts by weight (0.14 mole) of laurolactam, 22.43 parts by weight (0.14 mole) of isophthalic acid, 15.14 parts by weight (0.04) of bis(4-aminophenoxy)diphenyl sulfone, and 22.09 parts by weight (0.10 mole) of bis(4-aminocyclohexyl)methane were reacted. The product had an $\eta_{rel}$ value of 1.65, and the $T_g$ was 155° C.

EXAMPLE 7

By the method of Example 5, 23.00 parts by weight (0.12 mole) of laurolactam were reacted with 24.95 parts by weight (0.15 mole) of isophthalic acid, 7.56 parts by weight (0.01 mole) of bis(4-aminophenoxy)-diphenyl sulfone, and 28.64 parts by weight (0.14 mole) of bis(4-aminocyclohexyl)methane, using 0.5 wt. % of a catalyst system consisting of equal parts by weight of hypophosphorous acid and dimethylaminopyridine. The transparent product had an $\eta_{rel}$ value of 1.69 and a $T_g$ of 165° C.

EXAMPLE 8

By the method of Example 5, from 28.77 parts by weight (0.15 mole) of laurolactam, 22.50 parts by weight (0.14 mole) of a mixture of isophthalic acid and terephthalic acid in the ratio by weight of 95:5, 7.56 parts by weight (0.02 mole) of bis(4-aminophenoxy)-diphenyl sulfone and 25.54 parts by weight (0.12 mole) of bis(4-aminocyclohexyl)methane, a copolyamide was formed that was completely transparent; $\eta_{rel}=1.52$, $T_g=150°$ C.

EXAMPLE 9

Using the method of Example 5, 29.60 parts by weight (0.15 mole) of laurolactam, 12.46 parts by weight (0.08 mole) of isophthalic acid, and 32.44 parts by weight (0.08 mole) of bis(4-aminophenoxy)diphenyl sulfone were polycondensed with the addition of 0.5 wt. % of a catalyst system consisting of equal parts by weight of hypophosphorous acid and dimethylaminopyridine. A copolyamide was obtained that was completely transparent and had an $\eta_{rel}$ value of 1.45 and a $T_g$ of 135° C.

EXAMPLE 10

Starting materials 8.31 g (0.05 mole) IA
21.62 g (0.05 mole) BAPS
30.00 g (0.15 mole) lauric lactam (LL)
54.00 μl 50% aqueous $H_3PO_2$
61.00 mg DMAP The reaction was carried out as in Example 4. The polyamide showed a $T_g=110°$ and an $\eta_{rel}$ of 1.97.

EXAMPLE 11

Starting materials 8.31 g (0.05 mole) IA
21.62 g (0.05 mole) BAPS
5.00 g (0.025 mole) LL
288.00 μl 50% aqueous $H_3PO_2$
244.00 mg DMAP In the same way as Example 4, the components were stirred for 1 h at 280° C. and 2 h at 300° C. The polymer had 2 glass temperatures ($T_g$) at 160° and 190° C., and an $\eta_{rel}$ of 1.60.

EXAMPLE 12

Starting materials 8.31 g (0.05 mole) TA
21.62 g (0.05 mole) BAPS
30.00 g (0.15 mole) LL
54.00 μl 50% aqueous $H_3PO_2$
61.00 mg DMAP By the method of Example 4, the starting materials were polycondensed for 3 h at 280° C. and 2 h at 300° C. $T_g=180°$ C., $\eta_{rel}=1.53$.

EXAMPLE 13

Starting materials 8.31 g (0.05 mole) IA
21.62 g (0.05 mole) BAPS
25.00 g (0.13) aminododecanoic acid
218.00 μl 50% $H_3PO_2$
244.00 mg DMAP The product showed a $T_g$ of 110° C. and an $\eta_{rel}$ of 1.57.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding composition, comprising an aliphatic-/aromatic copolyamide polymer having statistically distributed throughout the polymer:
   (A) from greater than 40 to less than 100 mole % aliphatic monomer units containing amino groups, carboxyl groups or mixtures thereof; and
   (B) up to 60 mole % of aromatic monomer units containing amino groups, carboxyl groups or mixtures thereof, said aromatic monomer units containing at least one member selected from the group consisting of 4,4'-bis(4-aminophenoxy)-diphenyl sulfone, 4,4'-bis(3-aminophenoxy)diphenyl sulfone, 4,4'-bis(4-aminophenoxy)benzophenone, and 4,4'-bis(3aminophenoxy)benzophenone.

2. The molding composition of claim 1, wherein said aliphatic monomer units are derived from $C_{4-20}$ aliphatic dicarboxylic acids.

3. The molding composition of claim 2, wherein said aliphatic dicarboxylic acid is selected from the group consisting of succinic, glutaric, adipic, suberic, pimelic, and sebacic acids and their anhydrides and acid halides.

4. The molding composition of claim 1, wherein said carboxyl group-containing aromatic monomer unit is derived from unsubstituted isophthalic acid or terephthalic acid or mono- and poly-substituted isophthalic acid and terephthalic acid wherein said isophthalic and terephthalic acids are substituted on the aromatic ring with (a) $C_{1-6}$ alkyl groups, (b) phenyl or $C_{1-6}$ alkyl or aryl-substituted phenyl groups, (c) $C_{1-6}$ alkoxy groups, (d) unsubstituted phenoxy groups or phenoxy groups in which the phenyl ring is substituted by $C_{1-6}$ alkyl or aryl groups, or (e) halogens.

5. The molding composition of claim 1, wherein said carboxyl group-containing aromatic monomer unit is derived from a dicarboxylic acid of the formula $$HOOC-Ar-O-Ar-SO_2-Ar-O-Ar-COOH$$

wherein Ar is m-phenylene or p-phenylene.

6. The molding composition of claim 5, wherein said dicarboxylic acid is 4,4'-bis(4-carboxyphenoxy)diphenyl sulfone or 4,4'-bis(3-carboxyphenoxy)diphenyl sulfone.

7. The molding composition of claim 1, wherein said carboxyl group-containing aromatic monomer unit is derived from a dicarboxylic acid of the formula

HOOC—AR—A—AR—COOH wherein Ar is m-phenylene or p-phenylene, and A is —O—, —S—, —SO$_2$—, or —SO—.

8. The molding composition of claim 7, wherein said dicarboxylic acid is 4,4'-dicarboxydiphenyl ether, 4,4'-dicarboxydiphenyl sulfone, 4,4'-benzophenonedicarboxylic acid, or 4,4'-diphenyldicarboxylic acid.

9. The molding composition of claim 1, wherein said amino group-containing aliphatic monomer unit is derived from a C$_{4-20}$ aliphatic diamine.

10. The molding composition of claim 1, wherein said amino group-containing aromatic monomer unit is derived from an aromatic diamine selected from the group consisting of 4,4'-bis(4-aminophenoxy)diphenyl sulfone, 4,4'-bis(3-aminophenoxy)diphenyl sulfone, 4,4'-bis(4-aminophenoxy)benzophenone, 4,4'-bis(3-aminophenoxy)benzophenone and mixtures thereof.

11. The molding composition of claim 1, wherein up to 20 mole % of said amino group-containing aromatic monomer unit is replaced by monomer units derived from diamines of the formula H$_2$N—Ar—((Z)$_q$—Ar)$_r$—NH$_2$ wherein Ar is m-phenylene or p-phenylene, Z is an identical or different group selected from the group consisting of —O—, —S—, —SO$_2$—, —CO—, and —C(CH$_3$)$_2$—, q is 0 or 1, and r is 0, 1, or 2.

12. The molding composition of claim 11, wherein said diamine is selected from the group consisting of m-phenylenediamine, p-phenylenediamine, 4 4'-diaminodiphenyl ether, 4,4'-diaminodiphenyl sulfone and 4,4'-diaminobenzophenone.

13. The molding composition of claim 1, wherein said amino group-containing aliphatic monomer units and said carboxyl group-containing aliphatic monomer units are replaced by up to 100 mole % of C$_{4-20}$ aliphatic alpha, omega-amino carboxylic acids or lactams thereof.

14. The molding composition of claim 13, wherein said alpha, omega-amino carboxylic acid or lactam is selected from the group consisting of amino undecanoic acid, aminododecanoic acid, caprolactam and laurolactam.

15. The molding composition of claim 14, wherein said amino carboxylic acid lactam is caprolactam or laurolactam.

16. The molding composition of claim 1, wherein said copolyamide polymer has a viscosity in the range of $\eta_{rel}=1.10-2.30$ measured at 25° C. in m-cresol at a concentration of 0.5 wt. % of the copolyamide polymer.

17. The molding composition of claim 1, wherein said copolyamide polymer has a glass temperature in the range of 100°–220° C.

18. The molding composition of claim 1, wherein said copolyamide comprises greater than 60 mole % aliphatic monomer units.

19. The molding composition of claim 1, wherein said copolyamide comprises 80 to 95 mole % aliphatic monomer units.

20. The molding composition of claim 1, wherein said aromatic diamine is 4,4'-bis(4-aminophenoxy)diphenyl sulfone.

* * * * *